PETER W. JENSEN
INVENTOR.

BY Nathan N. Kallman

ATTORNEY

PETER W. JENSEN
INVENTOR.

BY Nathan N. Kallman

ATTORNEY

Dec. 21, 1965 P. W. JENSEN 3,225,134

TAPE REPRODUCING SYSTEM

Filed March 30, 1962

3 Sheets-Sheet 3

PETER W. JENSEN
INVENTOR.

BY Nathan N. Kallman

ATTORNEY 3,225,134

TAPE REPRODUCING SYSTEM

Peter W. Jensen, Fremont, Calif., assignor to Ampex Corporation, Redwood City, Calif., a corporation of California Filed Mar. 30, 1962, Ser. No. 183,886
11 Claims. (Cl. 178—5.4)

This invention relates to signal recording and reproducing systems that require extremely high degrees of time base stability, and particularly to systems for reproducing color television signals.

One of the most critical applications for which magnetic tape recording and reproducing systems are used involves the reproduction of a high quality color television signal, such as a signal that meets the color television signal standards imposed by governmental agencies in many countries similar to those established by the United States Federal Communications Commission. In addition to the usual timing components, including horizontal and vertical synchronizing pulses, color information is incorporated in a fashion that does not affect the basic black and white signal components. This is done by introducing a color reference burst and providing a chrominance component in the form of a subcarrier that is phase modulated by color hue information and amplitude modulated by color saturation information. An established value for the color subcarrier frequency has been determined and the limits within which this frequenmy must be maintained are specified with precision, but the nominal value of 3.58 megacycles per second (m.c.), which is usually referred to for convenience, will be used hereafter.

The extreme sensitivity of the eye to minute changes in color, and the extremely high information content of the color television signal, require that the phase relationship of the color subcarrier to the color burst must be maintained within a relatively few degrees. This degree of precision, however, involves time displacements of the order of a relatively few nanoseconds, and presents acute problems to any signal recording and reproducing system, whether electronic or mechanical.

The most satisfactory system for achieving the needed accuracy utilizes a moving magnetic head assembly to record and read transverse tracks on a relatively wide magnetic tape. With the heads mounted in a rotating drum, for example, high head to tape speeds are attained, even though the forward rate of movement of the tape is relatively low. Extremely good time base stability is achieved because a number of cumulative error corrections are feasible with this system. Thus, head to tape speed may be varied by changing the speed of the head drum, the transverse dimension of the tape may be varied by a female guide mechanism, and the longitudinal tape speed may be varied by the capstan drive. Although the invention will be described in terms of this particularly advantageous transverse track system, it will be recognized that it may be employed in other contexts as well.

Further increases in the accuracy of magnetic tape recording and reproducing systems have become feasible with the use of certain control and signal correction systems, which are best adapted for use with transverse track systems. In the wide-band signal reproducing system, for example, the synchronizing signal components in a television signal itself may be compared with an external synchronizing signal used as a reference. A preferred form of such system is described in Patent No. 3,017,462, entitled "Tape Apparatus Synchronizing System" and issued to Harold V. Clark et al. In accordance with this system, vertical synchronizing signals and horizontal synchronizing signals are compared to reference synchronizing signals, and phase error signals are derived for controlling the rotational speed of the magnetic head scanning drum and other corrective mechanisms.

It is also known to correct the time base of signals produced by such a wide-band system electronically, through comparison of the reproduced synchronizing signal components with an external reference signal, and through use of this comparison to adjust the delay introduced by an electronically variable delay circuit. Such an electronic time base correction, however, may not provide the precision needed for color signals. Accordingly, it is preferred to employ a further or different electronic time base correction, such as that described in the copending patent application entitled "Timing Control for Signal Reproducing Systems," filed January 2, 1962, Serial No. 163,817, and now Patent 3,100,816, and assigned to the assignee of the present invention. In systems according to the invention described therein, reference signals are derived from a reference source as the color subcarrier frequency, and sampling signals are derived from the actual reproduced color burst. The sampling signals are compared in phase with the reference signals, and a line-by-line correction of the phase of the color television signal is effected, whereby the desired order of time base stability is achieved.

In order for a reproduced color television signal to meet the required standards, however, a close and defined relationship must be maintained between the synchronizing signals and the color subcarrier. While systems that utilize the various error correction techniques described above can maintain this fixed relationship between the synchronizing signal and the color subcarrier, recordings made or duplicated otherwise often do not have stability in this respect. As a result of the cumulative effect of mechanical scanning errors during recording and reproduction, the periodicity of synchronizing signals may change at a relatively slow rate. This introduces a variation, called differential error, between the recorded color subcarrier and the recorded synchronizing signals. When such a non-standard signal is reproduced, the system tends to correct for the time displacement of the reproduced synchronizing signals from the reference synchronizing signals, introducing an instability into the color burst of a magnitude that cannot be overcome by the color correction circuitry and making the resultant color television signal unusuable for practical purposes.

In many other installations the color signal generating equipment introduces errors that affect the operation of signal reproducing systems. Over longer intervals (such as fifteen minutes or more), a slight drift tendency is likely to be encountered with even the most stable devices, and may cause an appreciable accumulated shift in the specified time relationship between the synchronizing signals and the color subcarrier. When this happens, there is a degradation of the color television signal as previously described.

It is therefore an object of the present invention to provide an improved system for improving the time base stability of a signal reproducing system.

Another object of the present invention is to provide an improved signal reproducing system, capable of playing back recorded color television signals.

Yet another object of the present invention is to provide an improved time base stability control system for a color television signal reproducing system, which permits generation of a satisfactory color television signal for transmission from a signal that is recorded subject to appreciable differential error between synchronizing signals and the color subcarrier.

Systems in accordance with the invention permit generation of a color television signal that is suitable for transmission from recorded signals subject to differential error by repositioning in time the synchronizing signals used as timing reference signals. To this end, slow varying components of an error signal resulting from phase comparison of a reproduced color burst and a reference subcarrier are used to generate a corresponding control signal. The control signal represents the differential error existing between the reproduced synchronizing signal and the reproduced color burst and is applied to a variable timing control circuit that repositions the reference synchronizing signals.

A feature of the invention is the use of an appreciable gain in the circuitry which is responsive to the control signal, thus maintaining the color components in a time-centered relation to the electronic correction circuitry. Another aspect of the invention is derived from the use of an alternate circuit having a lower gain and suitable for use where differential error is introduced over relatively longer intervals. This latter circuit is further characterized by means for recentering the incoming color bursts in time when the accumulated shift due to differential error equals one wave length of the color subcarrier.

In a specific arrangement for the reproduction of color television signals from previously prepared non-standard recordings subject to appreciable differential error, a system is employed that utilizes a mechanical servo system and a coarse electronic correction system, which are controlled by externally applied synchronizing reference signals. Further, a fine electronic correction circuit is employed which is controlled by the phase relationship between a color subcarrier reference signal and the color burst contained within the reproduced signal. An error signal is generated from the slow varying components derived from this phase comparison and is fed back to reposition the synchronizing reference signal in time. Through such arrangement, the reproduced color burst is maintained in locked relationship to the reference color subcarrier despite the existence of differential error greater than could be compensated for by the fine electronic correction circuitry.

A better understanding of the invention may be had by reference to the following description, taken in conjunction with the accompanying drawings, in which.

Figures 1, 4:
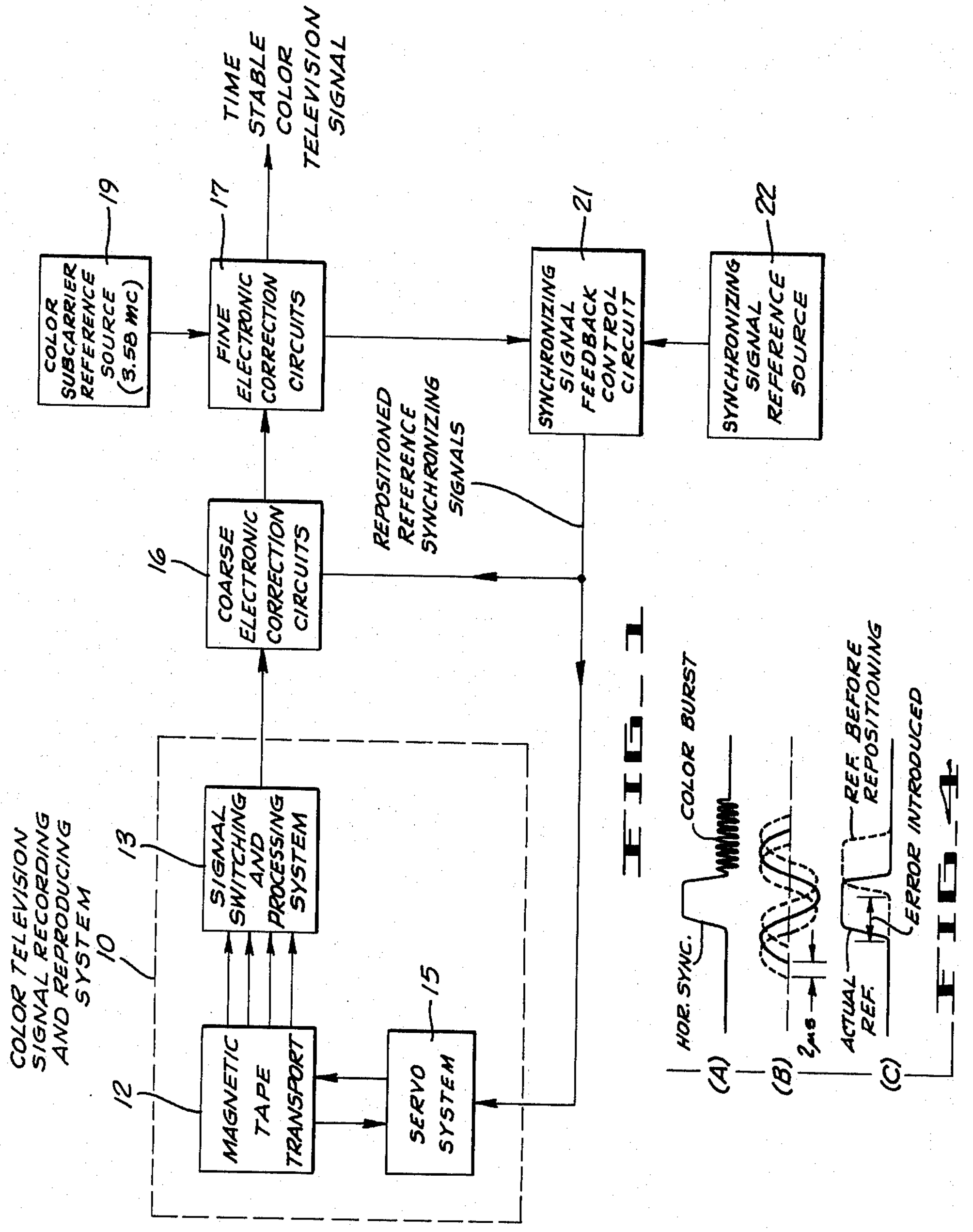
FIGURE 1 is a block diagram representation of a system in accordance with the invention utilizing a fine electronic correction circuit and a synchronizing signal feedback control circuit.
FIGURE 4 is a timing diagram showing various waveforms and timing relationships arising at different times during the operation of systems and circuits in accordance with the invention.

A system illustrative of the invention, as shown in FIGURE 1, includes a color television signal recording and reproducing system 10, shown only in very generalized form. Inasmuch as the principal elements of the present invention are concerned primarily with signal reproduction, elements concerned solely with signal recording have not been shown. Because of the fact that transverse track reproducing systems have been described in detail elsewhere, only the principal functional units of such a system have been shown, and these merely in general functional form. The over-all system 10 therefore includes a magnetic tape transport 12 past which moves a moving head assembly, such as a scanning drum containing four peripherally spaced heads that scan transverse lines across a relatively wide magnetic tape, which is cupped about the drum. During the reproduction of signals, each of the heads generates electrical signals as they scan the tape. Signals which appear in four separate output channels are thus applied to a signal switching and processing system 13, in which they are recombined into their original form in a single output channel. Inasmuch as it is desired to reshape the synchronizing signals, the processing circuits are also used to reconstitute the composite television signal. Correction of the time base to a first order of precision is effected by a servo system 15, which may be of the type described in the previously mentioned Clark et al. patent. That is, for the primary corrections of the time base, which are effected principally by variation of the scanning speed of the head drum, a control signal is derived by comparison of the reproduced horizontal and vertical synchronizing components with reference synchronizing signals. The reference signals are applied from an external source to the servo system 15, but in accordance with the invention may be repositioned to correspond to and compensate for the differential error in the system.

The composite television signal, which is reproduced by the transverse scan system 10, has far superior time base stability than signals provided from longitudinal recording systems. The signals may also encompass a much wider bandwidth than is feasible with other systems, and thus be directly usable for most television and instrumentation applications. For improvement of picture quality, and of time base stability, however, it is preferred then to apply the composite signal to electronic correction circuits 16. These circuits 16 are called coarse correction circuits only to distinguish them from subsequent circuitry. An electronically variable delay device compares the reproduced synchronizing signal components to the reference signal components to further adjust the time base. The coarse electronic correction circuits 16 do not, however, affect the differential error which may exist within the composition television signal. The differential error may typically have a 2 microsecond amplitude at a 7 cycle per second rate. The deviation is essentially entirely due to instabilities in the synchronizing signal, because the color subcarrier must be kept free of such irregularities from line to line and continuously if a useful color picture is to result.

When this composite signal is then applied to the fine electronic correction circuits 17, successive reproduced color bursts shift appreciably in time, relative to the stable reference subcarrier from associated source 19, from line to line. The amount of shift is dependent on the amount of the differential error, but the differential error may well exceed the correction capability of the fine electronic correction circuits 17. It may therefore be seen that the coarse electronic correction circuit 16 provides pulse-referenced reproduced wideband signals that may also be termed time-referenced reproduced signals and the fine electronic correction circuit 17 provides phase-referenced reproduced wideband signals.

In accordance with the present invention, a color locked television signal having the needed time base and phase stability is provided by the integrated use of a circuit that provides a repositioned reference synchronizing signal in response to the differential error existing in the composite television signal. In the operation of the fine electronic correction circuit 17, a phase error signal is generated from comparison of the reproduced 3.58 mc. signals with reference 3.58 mc. signals from a source 19. The slow varying component of this phase error signal is used to generate a control signal which is applied to a feedback coupling which includes a synchronizing signal feedback control circuit 21. The feedback control circuit 21 is in essence a variable timing control for synchronizing signals provided from a synchronizing signal reference source 22. A feature of the invention is the repositioning of the reference synchronizing signals on the time base in a selected proportional amount which is high relative to the time difference established by the actual phase error which exists. The high gain feedback compensates for the relatively slower rates of change which are possible in a mechanical servo system, and operates to maintain the successive reproduced color bursts in centered relation to the color subcarrier reference within the range of the fine electronic correction circuits 17. The repositioning of the reference synchronizing signal also affects the correction introduced by the coarse electronic correction circuits 16. Because the system 10 changes at a relatively slow rate, some of the error may initially accumulate in the coarse electronic correction circuits 16. After the servo portions of the system 10 come into play, however, this accumulated error is reduced essentially to zero.

Figure 2:
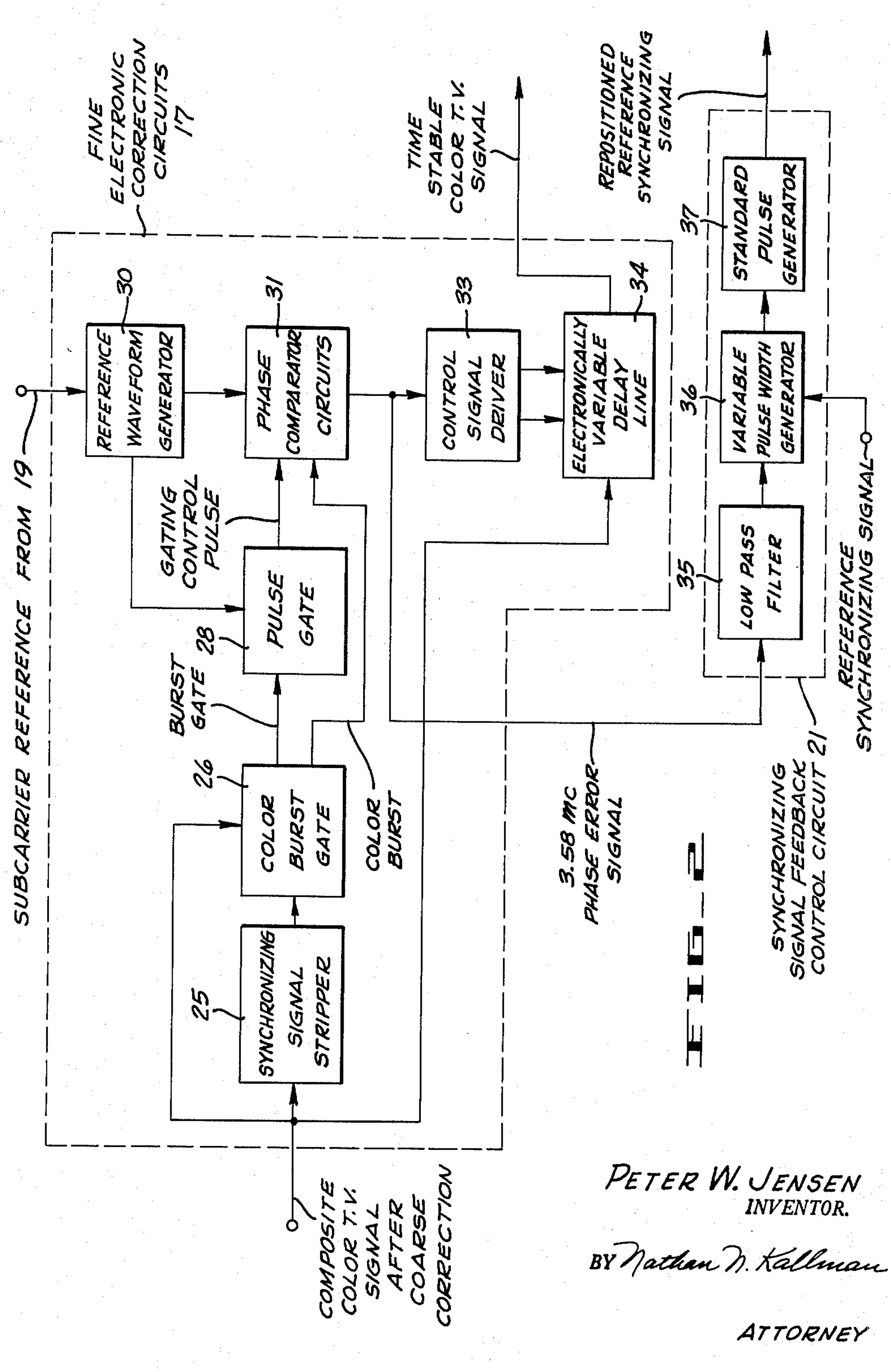
FIGURE 2 is a combined block diagram and schematic circuit representation of fine electronic correction circuits and synchronizing signal feedback control circuits arranged in accordance with the invention.

A specific example of the major functional units of the fine electronic correction circuit 17 and the synchronizing signal feedback circuit 21 is shown in FIGURE 2. The composite color television signal, after the second order time base adjustment in the coarse electronic correction circuit 16, is applied within the fine electronic correction circuit 17 to a synchronizing signal stripper circuit 25 and also to a color burst gate 26 and an electronically variable delay line 28. The stripped synchronizing signal from the circuit 25 is employed to open the color burst gate 26 so as to pass the reproduced color burst from the composite signal. In addition, the color burst gate 26 provides a burst gate signal, which substantially defines the length of the color burst interval. Such burst is used to control the time of operation of a pulse gate 28 which, upon actuation, is held open for a selected length of time by pulses derived from a reference waveform generator 30, so that only the principal central portion of the color burst is employed, this being the part of greatest time stability. The pulse gate 28 provides a gating control pulse to phase comparator circuits 31, to which the color burst is also applied. In the phase comparator circuits 31, selected reference points in the color bursts (e.g., the zero crossings occurring within the gating control pulse interval) are derived and used to sample the time relationship to the reference waveform.

In the preferred form of the arrangement, as discussed in detail in the above-mentioned patent application Ser. No. 163,817, the reference waveform is a sawtooth wave, and the phase error signal which is derived is representative of the amplitude of the sawtooth at the time of sampling. Because the subcarrier reference signal is both frequency and phase stable, any differential error existing in the composite television signal after the occurrence of a given horizontal synchronizing signal will be represented by a 3.58 mc. phase error signal at the output terminal of the phase comparator circuits 31. This phase error signal is applied to the synchronizing signal feedback control circuit 21, and also to a control signal driver 33 which controls the amount of delay introduced by the electronically variable delay line 28. The adjustment which is effected by the electronically variable delay line 28 locks the color components to the precise time base established by the color subcarrier reference source 19 of FIGURE 1. Both the phase and the amplitude relationships of the color subcarrier in the composite television signal are held constant from line to line. The adjustment of the synchronizing signals and the luminance components merely permits these components to follow the instability present in the recorded video signal. This does not, however, introduce any disturbing effect into the reproduced program material.

In the synchronizing signal feedback control circuit 21 the slow varying components in the 3.58 mc. phase error signal are extracted by a low pass filter circuit 35, and this signal is applied to the timing control input terminal of a variable pulse width generator 36 which is triggered by reference synchronizing signals. An integrating circuit is preferably employed in the filter 35 for deriving the low frequency components, because a number of samples (e.g., four or eight) are taken during each color burst in providing pulses of varying amplitudes representative of the phase error. The signal level representative of the slow varying components is used as a control signal, and is applied to control the variable pulse width generator 36. In accordance with the initial level which is established by the timing control input signal, the variable pulse width generator 36 provides a pulse which terminates at a selected time after the initiation of an applied synchronizing signal. The trailing edge of this pulse actuates a standard pulse generator 37 which then develops a time adjusted or repositioned reference signal. This signal, corresponding to a horizontal synchronizing signal, is coupled to the servo system 15 and coarse electronic correction circuit 16 of FIGURE 1.

A significant feature of this arrangement resides in the gain provided by the feedback system, this gain being expressed in terms of time or timing displacement. For the conditions previously described (i.e., reproduction of duplicated tapes) a gain of about 200 is typically employed. A phase error at 3.58 mc. of about 13° causes the reference synchronizing signal to be repositioned at a point about 2 microseconds from its standard position. This, it must be noted, represents the magnitude of the slow varying components of the phase error signal, and the differential error. The gain of the feedback circuit thus tends to hold the color burst which is applied to the fine electronic correction circuits 17 in a selected centered relationship to the correction range of those circuits 17. The gain also insures that the correction demanded of the circuits 17 will not be greater than the capability of the circuits 17. If the error signal has a constant value, there is no differential error, and no repositioning at the synchronizing reference.

These various operative factors may be better understood by reference to the illustrative waveforms of FIGURE 4 in conjunction with the operation of the arrangement of FIGURE 2. Waveform (A) provides an idealized simplified illustration of the relationship of a color burst to the horizontal synchronizing pulse of a color television signal, in accordance with the governing standards. When a differential error exists, the interval between the trailing edge of the horizontal synchronizing pulse and the color burst may be shortened or lengthened. The reproduced color burst may then shift, relative to its reference, either forward or backward in time (waveform (B)) as determined by the instantaneous value of the differential error. The phase error signal which is generated as a result of this phase displacement modifies the timing control signal level in response to which the reference synchronizing pulses are repositioned. The reference synchronizing pulses are shifted from the standard position, shown in phantom in waveform (C), to a new position so that the reproduced color burst remains closely related to its reference.

The system arrangement shown in FIGURE 1 may therefore be used for color replay of tapes, and duplicates made from directly recorded tapes, which have been prepared from or constitute non-standard sources.

Systems according to the invention may also be used to advantage to overcome the problems presented by the introduction of differential error in the operation of stable reference sources for synchronizing pulses. In these direct replay systems, the differential error is introduced much more slowly and it is preferred to employ a lower gain in the feedback circuit. A circuit which is particularly suitable for use in different applications and which has additional features is shown in the schematic diagram of FIGURE 3.

Figure 3:
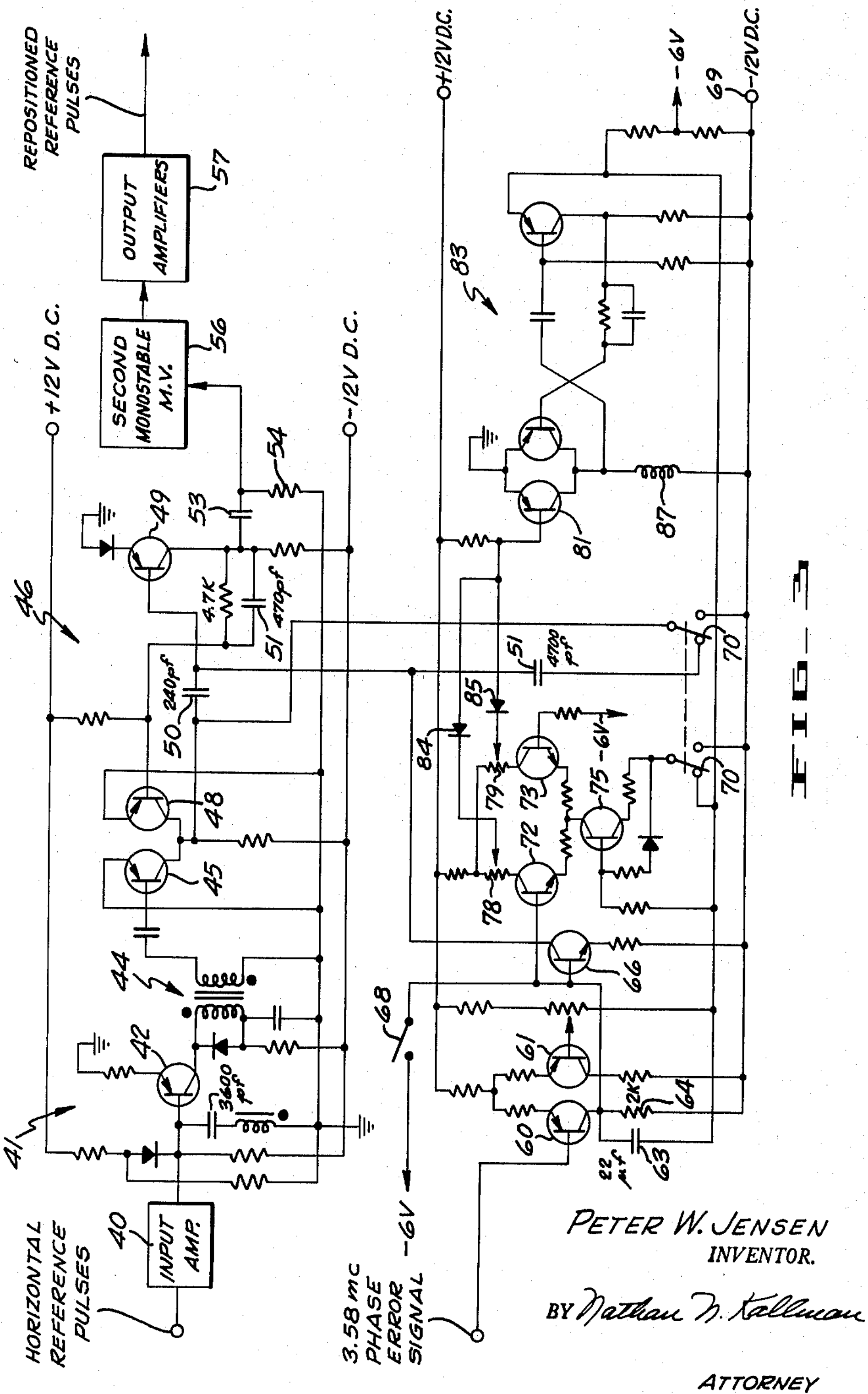
FIGURE 3 is a schematic circuit of one form of control circuit arranged in accordance with the invention.

Referring now to FIGURE 3, reference pulses drive a blocking oscillator circuit 41 through input amplifiers 40. The reference pulses are the time stable horizontal synchronizing pulses derived from the reference source 22 of FIGURE 1. In the blocking oscillator 41, a PNP conductivity type transistor 42 has a tuned collector circuit arranged to provide a minimum dwell time of 50 microseconds. The blocking oscillator 41 will therefore provide essentially only one pulse per television line interval, and prevents multiple triggerings which might result from the twice line rate pulses used for D.C. restoration during the vertical blanking intervals. The transistor 42 of the blocking oscillator 41 is coupled by a transformer 44 to a normally conducting PNP type amplifier transistor 45.

A pulse from the blocking oscillator 41 turns "ON" the transistor amplifier 45, triggering a first monostable multivibrator 46 which includes a pair of PNP type transistors 48, 49 having a time control circuit between the collector of the first transistor 48 and the base of the second transistor 49. In this time control circuit, a 240 picofarad capacitor 50 and a selectively insertable 4700 picofarad capacitor 51 are used in conjunction with a control signal to provide selectively variable discharge rates following initiation of a multivibrator 46 pulse. The width of the pulse from the multivibrator 46 is then controlled both by the capacitor 50, 51 configuration and the amplitude of the control signal.

Output pulses from the first monostable multivibrator 46 are differentiated by a capacitor 53 and resistor 54 network, and the trailing edge pulses thus developed are used to actuate a second monostable multivibrator 56. Each output pulse from the second monostable multivibrator 56 begins with the trailing edge of the pulse from the first monostable multivibrator 46 and has a duration corresponding to that of the standard horizontal synchronizing pulse. After suitable amplification in amplifiers 57, this signal constitutes a repositioned reference pulse.

It will be understood that the values shown for various circuit components have been provided for completeness only, and that while these values provide a practical device many variations are feasible within the techniques of modern circuit design. Similarly, various well known biasing, timing and pulse shaping arrangements which may be used in these circuits either have not been shown or are not described in detail for the purpose of clarity.

The discharge rates of the capacitors 50, 51 in the time control coupling of the first monostable multivibrator 46 are made responsive to selected frequency components of the 3.58 mc. phase error signal derived from the phase comparator circuits 31 within the fine electronic correction circuits 17. The 3.58 mc. phase error signal is provided to the base of the first transistor 60 in a differential amplifier pair 60, 61. High frequency components are effectively eliminated and a control signal level representative of the differential error is derived by an integrating circuit consisting of a 22 microfarad capacitor 63 and a 2 kilohm resistor 64 coupled to collector circuit of the differential amplifier. The output signal from the differential amplifier drives a constant current generator in the form of an NPN conductivity type transistor 66, the collector of which is coupled to the capacitors 50, 51 in the time control circuit of the first monostable multivibrator 46. Changes in the D.C. voltage level at the base of the transistor 66 vary the discharge current from the charged capacitors 50, 51, and thus control the time at which the multivibrator 46 is "OFF." The amount of shift on the time base, comparing the phase error to the repositioning of the synchronizing pulse, provides the gain of about 200 from the system.

A different mode of operation is also achieved by the same circuit elements, when the differential error is introduced at the much slower rate characteristic of studio synchronizing signal sources. A relay arm 68 closes a circuit which selectively applies a −6 volt signal to the transistor 66, substantially instantaneously discharging the capacitor 63. The −6 volt level is the amplitude at which the time relationships are centered and no repositioning is effected. The discharge provides a "dumping" action which resets the compensation for differential error. The dumping circuit and a lower gain are provided by setting a double-pole, double-throw switch 70 in its alternate position. This setting makes active certain additional circuitry, including a differential amplifier consisting of a pair of NPN type transistors 72, 73 which are coupled to receive the integrated phase error signal. An NPN type transistor 75 coupled to the differential amplifier acts as a constant current device in this circuit. A pair of adjustable resistors 78, 79 in the collector circuits of the differential amplifier transistors 72, 73 adjust the gains of the halves of the differential amplifier to selected like values. The opposite-going signals from the two parts of the differential amplifier control a third monostable multivibrator through a PNP type amplifier transistor 81. Excursions in either direction of the signal from the differential amplifier are coupled separately through negatively poled diodes 84, 85 to the base of the amplifier transistor 81 to trigger the third monostable multivibrator 83.

When the amount of differential error, as indicated by the amplitude of the control signal applied to the transistors 72, 73 and the settings of the resistors 78, 79, shows that the reference pulses are advanced or retarded by 280 microseconds relative to the time standard, the dumping action takes place. At a selected level of input voltage corresponding to the given error the amplifier transistor 81 conducts, triggering the third monostable multivibrator 83 for a selected interval which need only be relatively brief. The triggering energizes a relay coil 87 which closes the relay arm 68, thereby coupling the −6 volt source into the circuit and discharging the integrating capacitor 63 to reset it at the −6 volt level. This results in a change in the control signal level which is equivalent to repositioning the reference pulses by 280 microseconds. Inasmuch as this is equivalent to one wave length of the color subcarrier, however, the line centered relation of the incoming signal to the fine electronic correction system 17 is preserved. These changes in the synchronizing pulses occur at widely separated times and do not appear at troublesome disruptions of the signal.

The gain adjustment in operating in this mode is considerably lowered, to about twenty, by disconnecting the 4700 picofarad capacitor 51 from the circuit with the switch 70. The lowered gain permits compensation for the very slow drift of reference signal sources.

While there have been described various combinations of circuits and systems for providing high time base stability in a signal reproducing system, it will be appreciated that the invention is not limited thereto, and accordingly the invention should be considered to include all modifications, variations and alternative forms falling within the scope of the appended claims.

What is claimed is:

1. A color television signal reproducing system comprising:
- a wideband signal reproducing system operating in synchronism with externally applied reference synchronizing pulses for reproducing the color television signals;
- means providing reference synchronizing pulses;
- means providing color subcarrier reference signals;
- electronic correction means responsive to the reproduced color television signals and the color subcarrier reference signals for adjusting the time base of the reproduced color television signals;
- the electronic correction means including phase comparison means providing a phase error signal representative of the phase error of reproduced color bursts relative to the color subcarrier reference signals;
- means responsive to the phase error signal for deriving the slow varying components thereof; and
- means coupled to the wideband signal reproducing system and responsive to the slow varying components of the phase error signal and to the reference synchronizing pulses for applying repositioned reference synchronizing pulses to the wideband signal reproducing system.

2. A wideband signal reproducing system having a high order of time base stability comprising:
- reference pulse generating means;
- means responsive to the reference pulses for providing pulse-referenced reproduced wideband signals;

phase reference signal generating means;

means responsive to the pulse-referenced reproduced signals and to the phase reference signals for providing phase-referenced reproduced wideband signals; and means responsive to the operation of the phase referencing means for coupling repositioned reference pulses to the pulse referencing means.

3. A color television signal reproducing system comprising:

a wideband signal reproducing system operating in synchronism with externally applied reference synchronizing pulses for reproducing the color television signals;

means providing reference synchronizing pulses;

means providing color subcarrier reference signals;

electronic correction means responsive to the reproducing color television signals and the color subcarrier reference signals for adjusting the phase relation of the reproduced color television signals, the electronic correction means including phase comparison means providing a phase error signal representative of the phase error of reproduced color bursts relative to the color subcarrier reference signals;

integrator means responsive to the phase error signal for extracting slowly varying frequency components thereof to provide a control signal level;

variable pulse width generator means responsive to the control signal and to the reference synchronizing pulses for providing pulses initiated with the reference synchronizing pulses and terminating after an interval controlled by the control signal; and means coupled to receive the variable width pulses and responsive to the trailing edges thereof for providing repositioned reference synchronizing pulses to the wideband signal reproducing system.

4. The system as set forth in claim 3 above, having additionally:

means responsive to the control signal level for selectively varying the proportion of change of width of the variable width pulses;

wherein the means responsive to the reference synchronizing pulses includes blocking oscillator means providing a timed cycle preventing the application of more than one synchronizing pulse during a line interval;

and including in addition means responsive to the amplitude of the control signal and coupled to the variable pulse width generator for discharging the control signal level when the amount of phase error corresponds substantially to one wave length of the color subcarrier.

5. A wideband signal reproducing system for providing stable color components comprising:

reference pulse generating means defining a time base;

means responsive to the reference pulses for providing time-referenced reproduced signals in substantial synchronism with the time base;

phase reference signal generating means;

means responsive to the time-reference reproduced signals and to the phase reference signals for providing phase-referenced reproduced signals in phase with the phase reference signals, said means providing a phase error signal;

means responsive to selected frequency components of the phase error signal for providing a control signal; and variable pulse generator means responsive to the reference pulses and to the control signal for applying repositioned reference pulses to the time-referenced means.

6. A system for the reproduction of color television signals with color fidelity wherein correction is provided for differential error between the synchronizing pulses and the color bursts in the reproduced signals, including the combination of:

means, including a tape transport mechanism, for controllably reproducing the signals;

a servo system responsive to externally applied reference synchronizing signals for controlling the means for reproducing the signals to provide a first order of time base stability;

electronic means, responsive to the reproduced signals as adjusted by the servo system and to the externally applied reference synchronizing signals for adjusting the reproduced signals with reference to the synchronizing signals to provide a second order of time base stability;

means providing a color subcarrier reference signal;

means responsive to the signal having a second order of time base stability and to the color reference signal for providing a color locked composite television signal therefrom, the last named means including means for providing a phase error signal representative of the phase relation between the reproduced color burst and the color subcarrier reference;

means providing a reference synchronizing signal; and means responsive to the reference synchronizing signal and coupled to the servo system and the means for providing a second order of time base stability, and responsive to the phase error signals for repositioning the synchronizing signals to compensate for differential error.

7. A system for providing suitable color television signals for transmission from signals provided from nonstandard sources comprising:

a reproducing system including a servo system controlled by the time relationship between externally applied reference synchronizing pulses and reproduced synchronizing pulses;

means providing reference synchronizing pulses;

means responsive to the reproducing system and to externally applied reference synchronizing pulses for adjusting the time base of the reproduced signals relative to the synchronizing signals;

means providing a color subcarrier reference;

means responsive to the color subcarrier reference and the color burst of the time adjusted reproduced signals for generating a phase error signal;

means responsive to the phase error signal and to the time adjusted reproduced signal for effecting a line-by-line adjustment of the reproduced signals relative to the color reference; and means responsive to slow varying components of the phase error signal and to the reference synchronizing signals and coupled to the reproducing system and the means for adjusting the time base, thereby to reposition the reference synchronizing signals in accordance with the slow varying components of the phase error signal.

8. The invention as set forth in claim 6 above, wherein the means for repositioning the reference synchronizing signals includes:

a synchronizing signal feedback control circuit including a variable pulse width generator responsive to the reference synchronizing pulses and to the slow varying components of the phase error signal; and a pulse generator responsive to the variable width pulses, the feedback circuit being selected to provide a gain of about 200 relative to the phase error in time.

9. The invention as set forth in claim 7 above wherein the means for repositioning the reference synchronizing signal comprises:

a synchronizing signal feedback control circuit, including a pulse generator providing a repositioned synchronizing pulse at a time responsive to the amplitude of slow varying components of the phase error signal, the amount of repositioning adjustment being selected relative to the phase error to provide a gain of about 20 in the timing displacement of repositioned reference synchronizing signals; and including means responsive to selected amplitudes in the slow varying components of the phase error signal for readjusting the phase error signal when the phase displacement of the color burst from the color subcarrier reference is a full wave length of the color subcarrier.

10. A system for providing highly precise reproduced television signals despite slow varying differential error instabilities in the time relationship between reproduced synchronizing signals and reproduced color bursts, comprising:

a tape transport system;

a servo system responsive to the reproduced synchronizing signals and a reference signal for controlling the tape transport system to provide a reproduced signal having a first order time base stability;

a first electronic correction system responsive to the reproduced signal and to the reference synchronizing signal for providing a time corrected reproduced signal having a second order time base stability;

a color phase subcarrier reference signal source;

a second electronic correction system responsive to the time relation of the time corrected reproduced signal and the subcarrier reference signal for providing a phase corrected reproduced signal having a third order time base stability;

a synchronizing signal reference source;

a pulse generator circuit having a variable timing control and coupled to receive the reference synchronizing signal and to provide a time adjusted synchronizing signal; and control signal generator means, including integrator circuit means responsive to slow varying components of the phase error identified in the second electronic correction system and coupled to operate the variable timing control of the pulse generator circuit.

11. A system for providing highly precise reproduced television signals despite instabilities in the signals in the form of differential error existing between synchronizing pulses and color burst components, the system comprising:

a tape transport system;

means for reproducing signals from the tape;

a servo system responsive to reproduced syncronizing signals and reference synchronizing signals for controlling the tape transport system; and reproducing means to provide a reproduced signal having a first order of time base stability;

a first electronic correction system coupled to receive the reproduced signal and responsive to synchronizing signals therein and to the reference synchronizing signal for providing a time corrected reproduced signal having a second order of time base stability;

means providing a color subcarrier reference signal;

a second electronic correction system coupled to receive the time corrected reproduced signal from the first electronic correction system and responsive to color bursts therein and the color subcarrier reference signal for providing a time stable color television output signal, the second electronic correction system also providing a phase error signal;

integrator means responsive to the phase error signal and providing control signals which represents in amplitude the slow varying component of the phase error signal;

a variable pulse width generator circuit coupled to receive the reference synchronizing signal, and to be controlled by the control signal; and means responsive to the pulse width of the variable width signal for providing a repositioned reference synchronizing signal to the servo system and the first electronic correction system.

References Cited by the Examiner

UNITED STATES PATENTS

| | | | |
|---|---|---|---|
| 3,016,415 | 1/1962 | Johnson | 178—5.4 X |
| 3,017,462 | 1/1962 | Clark et al. | 178—6.6 X |
| 3,053,941 | 9/1962 | Johnson | 178—6.6 X |
| 3,075,041 | 1/1963 | Roizen et al. | 178—5.4 X |

DAVID G. REDINBAUGH, *Primary Examiner.*

ROBERT SEGAL, *Examiner.*